(12) United States Patent
Siu et al.

(10) Patent No.: US 12,430,813 B2
(45) Date of Patent: Sep. 30, 2025

(54) GENERATING VIRTUAL OBJECTS FROM EMBEDDED CODE

(71) Applicant: Adobe Inc., San Jose, CA (US)

(72) Inventors: Alexa Fay Siu, Sunnyvale, CA (US); Tong Sun, San Ramon, CA (US); Mustafa Doga Dogan, Cambridge, MA (US); Jennifer Anne Healey, San Jose, CA (US); Curtis Michael Wigington, Annandale, VA (US)

(73) Assignee: Adobe Inc., San Jose, CA (US)

( * ) Notice: Subject to any disclaimer, the term of this patent is extended or adjusted under 35 U.S.C. 154(b) by 193 days.

(21) Appl. No.: 18/109,517

(22) Filed: Feb. 14, 2023

(65) Prior Publication Data

US 2024/0273775 A1     Aug. 15, 2024

(51) Int. Cl.
  *G06T 11/00*     (2006.01)
  *G06K 7/14*      (2006.01)

(52) U.S. Cl.
  CPC ............ *G06T 11/00* (2013.01); *G06K 7/1417* (2013.01)

(58) Field of Classification Search
  CPC .............................. G06T 11/00; G06K 7/1417
  See application file for complete search history.

(56) References Cited

U.S. PATENT DOCUMENTS

| | | |
|---|---|---|
| 2016/0283794 A1 | 9/2016 | Barribeau |
| 2018/0101993 A1 | 4/2018 | Mitchell |
| 2019/0362516 A1 | 11/2019 | Suzuki et al. |
| 2021/0110557 A1* | 4/2021 | Busey ............... G06T 19/006 |
| 2022/0253264 A1* | 8/2022 | Berliner ............. G06F 3/011 |
| 2022/0254074 A1* | 8/2022 | Berliner ............. H04L 51/58 |
| 2023/0334791 A1* | 10/2023 | Etwaru .............. G06F 3/165 |

FOREIGN PATENT DOCUMENTS

KR     101888913 B1     9/2018

OTHER PUBLICATIONS 2319111.7, "IPO Search and Examination Report", GB Patent Application 2319111.7, 8 pages.
"Information capacity and versions of QR Code", QR code.com [retrieved Dec. 8, 2022]. Retrieved from the Internet <https://www.qrcode.com/en/about/version.html>., 2 Pages.
"IR Inks", LDP LLC—maxmax.com [retrieved Dec. 7, 2022]. Retrieved from the Internet <https://maxmax.com/phosphorsdyesandinks/infrared-phosphors-dyes-and-inks/infrared-down-conversion-powder/ir-ink-down-conversion>., 12 Pages.

(Continued)

*Primary Examiner* — Michelle Chin
(74) *Attorney, Agent, or Firm* — FIG. 1 Patents

(57) ABSTRACT

In implementation of techniques for generating virtual objects from embedded code, a computing device implements an embedded code system to detect an embedded code included in a physical object depicted in a frame of a digital video displayed in a user interface. The physical object includes visual features, and the embedded code is not visible relative to the visual features. The embedded code system determines a virtual object property based on the embedded code. A virtual object is generated for display relative to the visual features of the physical object in the user interface based on the virtual object property.

20 Claims, 12 Drawing Sheets

(56) References Cited

OTHER PUBLICATIONS

Alessandrini, Andrea, et al., "Audio-augmented paper for therapy and educational intervention for children with autistic spectrum disorder", International Journal of Human-Computer Studies, vol. 72, No. 4 [retrieved Dec. 9, 2022]. Retrieved from the Internet <https://doi.org/10.1016/j.ijhcs.2013.12.001>., Apr. 1, 2014, 9 Pages.

Ashtari, Narges, et al., "Creating Augmented and Virtual Reality Applications: Current Practices, Challenges, and Opportunities", CHI '20: Proceedings of the 2020 CHI Conference on Human Factors in Computing Systems [retrieved Dec. 7, 2022]. Retrieved from the Internet <http://hci.cs.sfu.ca/AshtariCHI2020.pdf>., Apr. 2020, 13 pages.

Chen, Zhutian, et al., "Augmenting Static Visualizations with PapARVis Designer", CHI '20: Proceedings of the 2020 CHI Conference on Human Factors in Computing Systems [retrieved Dec. 7, 2022]. Retrieved from the Internet <https://www.pure.ed.ac.uk/ws/portalfiles/portal/130591371/chen2020augmenting.pdf>., Apr. 23, 2020, 13 Pages.

Conlen, Matthew, et al., "Idyll Studio: A Structured Editor for Authoring Interactive & Data-Driven Articles", UIST 21: The 34th Annual ACM Symposium on User Interface Software and Technology [retrieved Dec. 7, 2022]. Retrieved from the Internet <http://idl.cs.washington.edu/files/2021-IdyllStudio-UIST.pdf>., Oct. 12, 2021, 12 Pages.

De Guzman, Jaybie, et al., "Security and Privacy Approaches in Mixed Reality: A Literature Survey", Cornell University arXiv, arXiv.org [retrieved Dec. 7, 2022]. Retrieved from the Internet <https://arxiv.org/pdf/1802.05797.pdf>., Jun. 10, 2020, 41 Pages.

Dogan, Mustafa Doga, "InfraredTags: Embedding Invisible AR Markers and Barcodes Using Low-Cost, Infrared-Based 3D Printing and Imaging Tools", Cornell University arXiv, arXiv.org [retrieved Dec. 7, 2022]. Retrieved from the Internet <https://arxiv.org/pdf/2202.06165.pdf>., Feb. 12, 2022, 12 Pages.

Fanning, Betsy, "Preservation with PDF/A", DPC Technology Watch Report [retrieved Dec. 7, 2022]. Retrieved from the Internet <https://www.dpconline.org/docs/technology-watch-reports/1707-twr17-01-revised/file>., Jul. 17, 2017, 34 Pages.

Fu, Jiayun, et al., "Chartem: Reviving Chart Images with Data Embedding", IEEE Transactions on Visualization and Computer Graphics, vol. 27, No. 2 [retrieved Dec. 7, 2022]. Retrieved from the Internet <10.1109/TVCG.2020.3030351>., Dec. 14, 2020, 10 Pages.

Getschmann, Christopher, et al., "Seedmarkers: Embeddable Markers for Physical Objects", TEI '21: Proceedings of the Fifteenth International Conference on Tangible, Embedded, and Embodied Interaction [retrieved Dec. 7, 2022]. Retrieved from the Internet <https://doi.org/10.1145/3430524.3440645>, Feb. 2021, 11 Pages.

Giraudeau, Philippe, et al., "Cards: A Mixed-Reality System for Collaborative Learning at School", ISS '19: Proceedings of the 2019 ACM International Conference on Interactive Surfaces and Spaces [retrieved Dec. 7, 2022]. Retrieved from the Internet <https://web.archive.org/web/20210715162921id_/https://hal.inria.fr/hal-02313463v3/file/ISS_Giraudeau.pdf>., Nov. 10, 2019, 11 Pages.

Gitelman, Lisa, "Paper Knowledge: Toward a Media History of Documents", Duke University Press [retrieved Dec. 9, 2022]. Retrieved from the Internet <https://www.dukeupress.edu/paper-knowledge>., Mar. 2014, 224 Pages.

Grubert, Jens, et al., "Towards Pervasive Augmented Reality: Context-Awareness in Augmented Reality", IEEE Transactions on Visualization and Computer Graphics, vol. 23, No. 6 [retrieved Dec. 7, 2022]. Retrieved from the Internet <https://www.hci.otago.ac.nz/pubs/2016_GrubertLanglotzZollmannRegenbrecht_PAR_TVCG_Preprint_lowres.pdf>., Jun. 1, 2017, 20 Pages.

Gutiérrez, Francisco, et al., "Phara: an augmented reality grocery store assistant", MobileHCI '18: Proceedings of the 20th International Conference on Human-Computer Interaction with Mobile Devices and Services Adjunct [retrieved Dec. 7, 2022]. Retrieved from the Internet <https://ceur-ws.org/Vol-1953/healthRecSys17_paper_7.pdf>., Sep. 3, 2018, 49 Pages.

Han, Feng, et al., "Hybrid Paper-Digital Interfaces: A Systematic Literature Review", DIS '21: Designing Interactive Systems Conference [retrieved Dec. 9, 2022]. Retrieved from the Internet <https://doi.org/10.1145/3461778.3462059>., Jun. 28, 2021, 14 Pages.

Head, Andrew, et al., "Augmenting Scientific Papers with Just-in-Time, Position-Sensitive Definitions of Terms and Symbols", CHI '21: Proceedings of the 2021 CHI Conference on Human Factors in Computing Systems [retrieved Dec. 7, 2022]. Retrieved from the Internet <https://andrewhead.info/assets/pdf/augmenting-scientific-papers.pdf>., May 7, 2021, 18 Pages.

Holman, David, et al., "Paper windows: interaction techniques for digital paper", CHI '05: Proceedings of the SIGCHI Conference on Human Factors in Computing Systems [retrieved Dec. 7, 2022]. Retrieved from the Internet <https://3dvar.com/Holman2005PaperWindows.pdf>., Apr. 2, 2005, 10 Pages.

Holmquist, Lars Erik, et al., "Tagging the world", Interactions, vol. 13, No. 4 [retrieved Dec. 9, 2022]. Retrieved from the Internet <10.1145/1142169.1142201>., Jul. 1, 2006, 2 Pages.

Jansen, Pascal, "ShARe: Enabling Co-Located Asymmetric Multi-User Interaction for Augmented Reality Head-Mounted Displays", UIST '20: Proceedings of the 33rd Annual ACM Symposium on User Interface Software and Technology [retrieved Dec. 7, 2022]. Retrieved from the Internet <https://www.uni-ulm.de/fileadmin/website_uni_ulm/iui.inst.100/1-hci/hci-paper/2020/ShARe.pdf>., Oct. 20, 2020, 13 Pages.

Kang, Seokbin, et al., "ARMath: Augmenting Everyday Life with Math Learning", CHI Conference on Human Factors in Computing Systems [retrieved Dec. 7, 2022]. Retrieved from the Internet <https://makeabilitylab.cs.washington.edu/media/publications/Kang_ArmathAugmentingEverydayLifeWithMathLearning_CHI2020.pdf>., Apr. 23, 2020, 15 Pages.

Kawahara, Yoshihiro, "Instant Inkjet Circuits: Lab-based Inkjet Printing to Support Rapid Prototyping of UbiComp Devices", ACM Joint Conference on Pervasive and Ubiquitous Computing [retrieved Dec. 7, 2022]. Retrieved from the Internet <https://web.archive.org/web/20200323050310id_/https://www.microsoft.com/en-us/research/wp-content/uploads/2016/02/ubi1415-instant20inkjet.pdf>., Sep. 8, 2013, 10 pages.

Kim, Han-Jong, et al., "miniStudio: Designers' Tool for Prototyping Ubicomp Space with Interactive Miniature", CHI 16: Proceedings of the 2016 CHI Conference on Human Factors in Computing Systems [retrieved Dec. 7, 2022]. Retrieved from the Internet <DOI:10.1145/2858036.2858180>, May 7, 2016, 12 Pages.

Krum, David, et al., "Augmented reality using personal projection and retroreflection", Personal and Ubiquitous Computing, vol. 16, No. 1 [retrieved Dec. 7, 2022]. Retrieved from the Internet <https://doi.org/10.1007/s00779-011-0374-4>., Jan. 2012, 10 Pages.

Lee, Jaewook, et al., "User Preference for Navigation Instructions in Mixed Reality", IEEE Conference on Virtual Reality and 3D User Interfaces (VR) [retrieved Dec. 7, 2022]. Retrieved from the Internet <https://3dvar.com/Lee2022User.pdf>., Mar. 2022, 12 Pages.

Lehman, Sarah, et al., "Hidden in Plain Sight: Exploring Privacy Risks of Mobile Augmented Reality Applications", ACM Transactions on Privacy and Security vol. 25, No. 4 [retrieved Dec. 7, 2022]. Retrieved from the Internet <https://www3.cs.stonybrook.edu/~hling/publication/HiddenOps_TOPS_Final.pdf>., Jul. 9, 2022, 35 Pages.

Li, Dingzeyu, et al., "AirCode: Unobtrusive Physical Tags for Digital Fabrication", Cornell University arXiv, arXiv.org [retrieved Dec. 7, 2022]. Retrieved from the Internet <https://arxiv.org/pdf/1707.05754.pdf>., Aug. 7, 2017, 14 Pages.

Li, Zhen, "HoloDoc: Enabling Mixed Reality Workspaces that Harness Physical and Digital Content", Proceedings of the CHI Conference on Human Factors in Computing Systems [retrieved Dec. 7, 2022]. Retrieved from the Internet <https://web.archive.org/web/20200227050235id_/https://www.microsoft.com/en-us/research/uploads/prod/2019/05/HoloDoc-CHI-2019.pdf>., May 2, 2019, 14 Pages.

Mackay, Wendy, et al., "The missing link: augmenting biology laboratory notebooks", UIST '02: Proceedings of the 15th annual ACM symposium on User interface software and technology [retrieved Dec. 7, 2022]. Retrieved from the Internet <https://www.lri.fr/~mbl/Teach/SituatedComputing/2017/papers/AugmentedReality/ABook-Mackay-UIST02.pdf>., Oct. 27, 2002, 10 Pages.

(56) References Cited

OTHER PUBLICATIONS

Maia, Henrique Teles, et al., "LayerCode: optical barcodes for 3D printed shapes", ACM Transactions on Graphics, vol. 38, No. 4 [retrieved Dec. 7, 2022]. Retrieved from the Internet <https://par.nsf.gov/servlets/purl/10112728>., Jul 12, 209, 17 Pages.

Oguz, Fatih, et al., "URL decay at year 20: A research note", Journal of the Association for Information Science and Technology, vol. 67, No. 2 [retrieved Dec. 7, 2022]. Retrieved from the Internet <https://core.ac.uk/download/pdf/345082068.pdf>., Jun. 1, 2015, 5 Pages.

Qian, Jing, et al., "Dually Noted: Layout-Aware Annotations with Smartphone Augmented Reality", CHI '22: Proceedings of the 2022 CHI Conference on Human Factors in Computing Systems [retrieved Dec. 7, 2022]. Retrieved from the Internet <https://web.archive.org/web/20220507070401id_/https://dl.acm.org/doi/pdf/10.1145/3491102.3502026>., Apr. 29, 2022, 15 Pages.

Rajaram, Shwetha, et al., "Paper Trail: An Immersive Authoring System for Augmented Reality Instructional Experiences", CHI '22: Proceedings of the 2022 CHI Conference on Human Factors in Computing Systems [retrieved Dec. 7, 2022]. Retrieved from the Internet <https://web.archive.org/web/20220502221018id_/https://dl.acm.org/doi/pdf/10.1145/3491102.3517486>., Apr. 29, 2022, 16 Pages.

Rosner, Daniela, et al., "Spyn: augmenting the creative and communicative potential of craft", CHI '10: Proceedings of the SIGCHI Conference on Human Factors in Computing Systems [retrieved Dec. 7, 2022]. Retrieved from the Internet <https://people.ischool.berkeley.edu/~kimiko/papers/CHI2010.Rosner.Ryokai.Spyn.pdf>., Apr. 10, 2010, 10 Pages.

Silapasuphakornwong, Piyarat, et al., "Embedding Information in 3D Printed Objects Using Double Layered near Infrared Fluorescent Dye", International Journal of Materials, Mechanics and Manufacturing, vol. 7, No. 6 [retrieved Dec. 7, 2022]. Retrieved from the Internet <https://web.archive.org/web/20200507111929id_/http://www.jmmm.org/vol7/465-PC019.pdf>., Dec. 2019, 5 Pages.

Song, et al., "PenLight: combining a mobile projector and a digital pen for dynamic visual overlay", In Proceedings of SIGCHI Conference on Human Factors in Computing Systems [retrieved Dec. 7, 2022]. Retrieved from the Internet <http://www.cs.cornell.edu/~francois/Papers/p143-song.pdf>., Apr. 4, 2009, 10 Pages.

Speicher, Maximilian, et al., "What is Mixed Reality?", CHI '19: Proceedings of the 2019 CHI Conference on Human Factors in Computing Systems [retrieved Dec. 7, 2022]. Retrieved from the Internet <http:/library.usc.edu.ph/ACM/CHI2019/1proc/paper537.pdf>., May 2, 2019, 15 Pages.

Tancik, Matthew, "StegaStamp: Invisible Hyperlinks in Physical Photographs", Cornell University arXiv, arXiv.org [retrieved Dec. 7, 2022]. Retrieved from the Internet <https://arxiv.org/pdf/1904.05343.pdf>., Mar. 26, 2020, 13 Pages.

Tensmeyer, Chris, et al., "PageNet: Page Boundary Extraction in Historical Handwritten Documents", Cornell University arXiv, arXiv.org [retrieved Dec. 7, 2022]. Retrieved from the Internet <https://arxiv.org/pdf/1709.01618.pdf>., Sep. 5, 2017, 6 Pages.

Truong, Huong May, "Integrating learning styles and adaptive e-learning system: Current developments, problems and opportunities", Computers in Human Behavior, vol. 55, Part B [retrieved Dec. 7, 2022]. Retrieved from the Internet <https://isiarticles.com/bundles/Article/pre/pdf/74171.pdf>., Feb. 1, 2016, 3 Pages.

Ungureanu, Dorin, et al., "HoloLens 2 Research Mode as a Tool for Computer Vision Research", Cornell University arXiv, arXiv.org [retrieved Dec. 8, 2022]. Retrieved from the Internet <https://arxiv.org/pdf/2008.11239.pdf>., Aug. 25, 2020, 7 Pages.

Ur, Blase, et al., "Trigger-Action Programming in the Wild: An Analysis of 200,000 IFTTT Recipes", CHI '16: Proceedings of the 2016 CHI Conference on Human Factors in Computing Systems [retrieved Dec. 8, 2022]. Retrieved from the Internet <https://www.blaseur.com/papers/chi16-ifttt.pdf>., May 7, 2016, 5 Pages.

Victor, Bret, "Research Agenda and Former Floor Plan", Worry Dream [retrieved Dec. 2022-p]. Retrieved from the Internet <http://worrydream.com/cdg/ResearchAgenda-v0.19-poster.pdf>., 2014, 1 Page.

Vlahakis, V., et al., "Personalized augmented reality touring of archaeological sites with wearable and mobile computers", Proceedings. Sixth International Symposium on Wearable Computers [retrieved Dec. 7, 2022]. Retrieved from the Internet <http://webserver2.tecgraf.puc-rio.br/~mgattass/ra/ref/RA_Ruinas/01167214.pdf>., Oct. 2002, 8 Pages.

Wang, Zeyu, et al., "AniCode: authoring coded artifacts for network-free personalized animations", Cornell University arXiv, arXiv.org [retrieved Dec. 8, 2022]. Retrieved from the Internet <https://arxiv.org/pdf/1807.11627.pdf>., May 9, 2019, 12 Pages.

Want, Roy, et al., "Bridging physical and virtual worlds with electronic tags", CHI '99: Proceedings of the SIGCHI conference on Human Factors in Computing Systems [retrieved Dec. 8, 2022]. Retrieved from the Internet <https://web.archive.org/web/20051109055621id_/http://guir.berkeley.edu:80/courses/cs198/papers/p370-want.pdf>., May 1, 1999, 8 Pages.

Willis, Karl, et al., "HideOut: mobile projector interaction with tangible objects and surfaces", 7th International Conference on Tangible, Embedded and Embodied Interaction [retrieved Dec. 8, 2022]. Retrieved from the Internet <https://web.archive.org/web/20130308181923id_/http://www.disneyresearch.com:80/wp-content/uploads/HideOutPaper.pdf>., Feb. 10, 2013, 8 Pages.

Willis, et al., "InfraStructs: Fabricating Information Inside Physical Objects for Imaging in the Terahertz Region", ACM Transactions on Graphics, vol. 32, No. 4 [retrieved Dec. 8, 2022]. Retrieved from the Internet <https://web.archive.org/web/20170809150518id_/http://www.karlddwillis.com/wp/wp-content/uploads/2011/03/SIGGRAPH2013-InfraStructs.pdf>., Jul. 21, 2013, 10 pages.

Xiao, Chang, et al., "FontCode: Embedding Information in Text Documents Using Glyph Perturbation", Cornell University arXiv, arXiv.org [retrieved Dec. 8, 2022]. Retrieved from the Internet <https://arxiv.org/pdf/1707.09418.pdf>., Jul. 28, 2017, 15 Pages.

Yadav, Garima, et al., "Contrast limited adaptive histogram equalization based enhancement for real time video system", International Conference on Advances in Computing, Communications and Informatics [retrieved Dec. 8, 2022]. Retrieved from the Internet <10.1109/ICACCI.2014.6968381>., Sep. 2014, 6 Pages.

\* cited by examiner

GENERATING VIRTUAL OBJECTS FROM EMBEDDED CODE

BACKGROUND

Code reading systems are capable of detecting embedded codes such as codes included on physical objects, for example, a barcode printed on a product, a QR code displayed at a table of a restaurant, etc. Once detected, the embedded codes are then readable to provide additional information. The code reading systems leverage the additional information provided by reading the embedded codes in a variety of different ways (e.g., a price of the product read from the barcode is added to a running total price, a menu for the restaurant is displayable based on reading the QR code, etc.).

SUMMARY

Techniques and systems for generating virtual objects from embedded code are described. In an example, an embedded code system receives data describing a frame of digital video captured by an image capture device which is displayed in a user interface of a display device. The frame of digital video depicts a physical object including an embedded code and visual features. The embedded code is not visible relative to the visual features in the user interface.

For example, the embedded code system detects the embedded code. Based on detecting the embedded code, the embedded code system determines a virtual object property for a virtual object. In a particular example, the embedded code system also determines a boundary of the physical object. The embedded code system generates the virtual object for display relative to the visual features of the physical object in the user interface based on the virtual object property. In the particular example above, the embedded code system generates the virtual object for display in the user interface based on the boundary of the physical object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
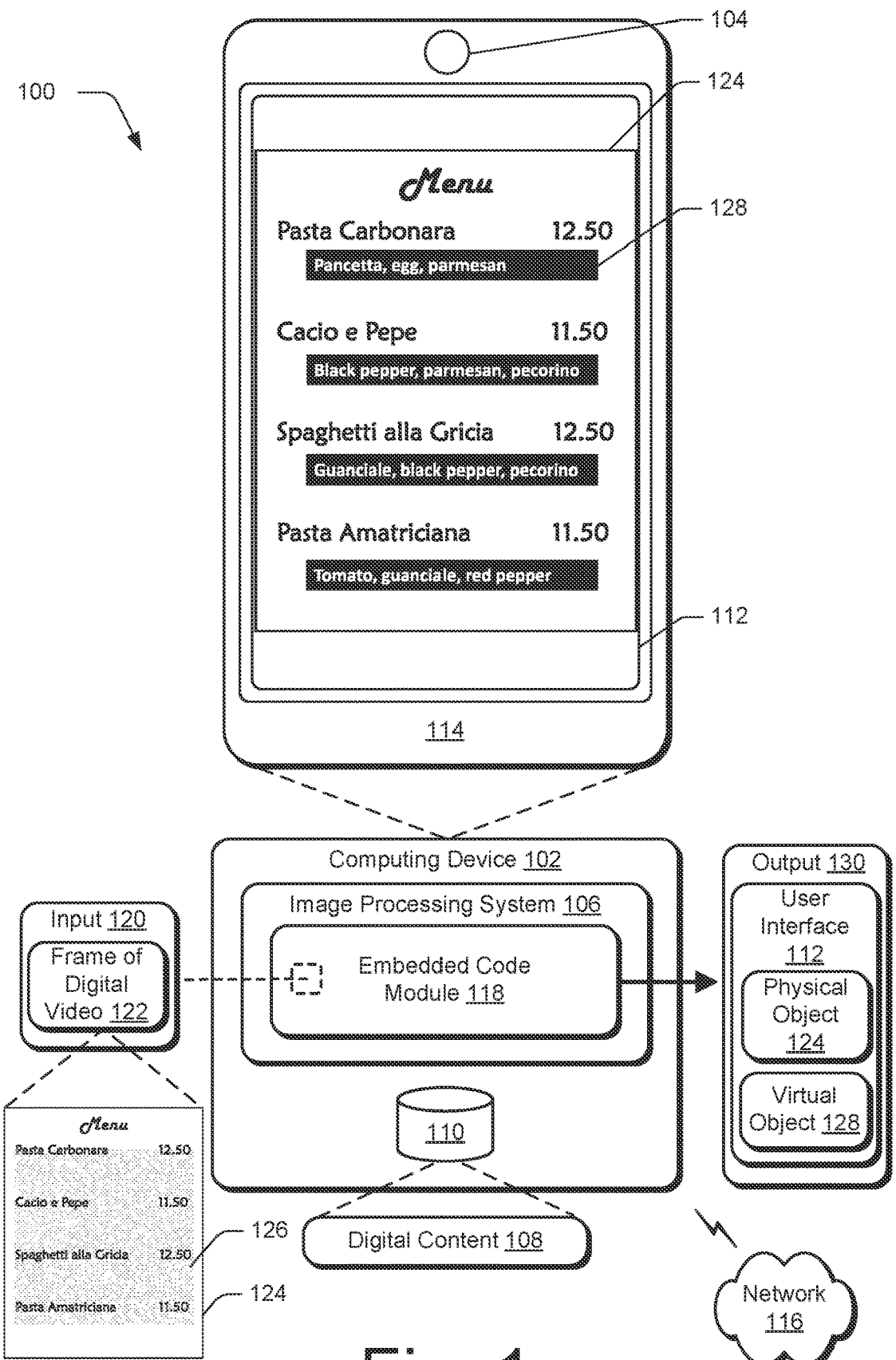
FIG. 1 is an illustration of a digital medium environment in an example implementation that is operable to employ techniques and systems for generating virtual objects from embedded code as described herein.

Physical documents are a common medium for capturing, sharing, and communicating information. However, physical documents are limited to displaying static information printed on the physical document. To expand beyond the content of a physical document and other physical objects, conventional techniques implement a scannable code (e.g., a QR code, a barcode, embedded machine-readable code, embedded optical code, an embedded tag, etc.) printed on a physical object that is detectable using an image capture device of a user's computing device (e.g., a smartphone). In response to detecting and reading the scannable code, the computing device generates a user interface element for display in a user interface of the computing device which directs the user to a website in an attempt to create a hybrid paper-digital interface. However, conventional systems only encode a limited amount of information (e.g., a URL for a website) in scannable code printed on a physical object.

Although it is possible to increase an amount of the information encoded in the scannable code by increasing a size of the printed code relative to the physical object, this also comes at a cost of a larger footprint for the scannable code, which obstructs visual features included on the physical object. Consider an example in which a scannable code is to be printed on a menu of a restaurant. If the scannable code encodes a relatively small amount of information (e.g., a website of the restaurant), then the scannable code can be discretely printed on the menu (e.g., at the bottom of the page) without visually interfering with information conveyed by the menu such as food items and corresponding prices. If the scannable code encodes a relatively large amount of information (e.g., ingredient lists and nutrition information for the food items), then it is not possible to print the code on the menu without visually interfering with the information conveyed by the menu. The reason for this is because a size of the code required to encode the relatively large amount of information is as large as (or larger than) the menu itself, and this code would obscure the food items and corresponding prices.

In order to overcome these limitations, techniques and systems for generating virtual objects from embedded code are described. In an example, a physical object (e.g., a document, a menu, a pamphlet, etc.) includes visible features and an embedded code that is not visible. For example, the embedded code is not visible because it is printed using an infrared light absorbing ink that is invisible to the human eye. In other examples, the embedded code is printed using cerium oxalate or other chemicals that are not visible to the human eye. Additionally or alternatively, the embedded code is a watermark embossed onto the physical object. Notably, although the embedded code is not visible, the code is detectable using a digital camera such as an infrared camera. Because the embedded code printed using the infrared light absorbing ink is not visible, the embedded code can be increased in size without obstructing the visual features included on the physical object. For example, a conventional code printed on a physical object obstructs features of the physical object if printed too large. This is why conventional printed codes are small and typically include a link to additional information stored elsewhere. A large code printed using ink that is not visible, however, allows the code to include enough information to generate virtual objects containing additional information directly in a user interface.

In one example, a computing device implements an embedded code system to receive data describing a frame of digital video captured by an image capture device (e.g., an infrared camera) and displayed in the user interface. In some examples, the image capture device includes a camera that captures visible light (e.g., visible to a human) and an infrared camera that captures infrared light (e.g., not visible to a human). The frame of digital video depicts the physical object that includes the visual features and the embedded code. The visual features of the physical object are visible in the user interface, but the embedded code is not visible relative to the visual features in the user interface in one example.

For example, the embedded code system detects the embedded code and determines a virtual object property based on the embedded code. The embedded code system then generates a virtual object for display relative to the visual features of the physical object in the user interface based on the virtual object property. This adds additional content directly to the user interface in the form of the virtual object. For instance, the virtual object property determined by the embedded code system includes additional text in the form of a label related to the visual features of the physical object which is displayable relative to the visual features in the user interface.

In some examples, the embedded code system also detects a boundary of the physical object using a machine learning model (e.g., a convolutional neural network). Because the embedded code is relatively large in size (e.g., a size similar to a size of the boundary of the physical object), the virtual object properties described by the code are displayable using coordinates specified by virtual object properties relative to the detected boundary of the physical object. For example, the virtual object property includes coordinates relative to the boundary of the physical object which are associated with the virtual object specified in the embedded code. This ensures that the virtual object is displayed appropriately relative to the visual features of the physical object in the user interface.

Generating virtual objects from embedded code in this manner overcomes the disadvantages of conventional code reading techniques that are limited to using embedded codes that are visible relative to visual features of physical objects. Because the embedded code is printed on the physical object using, e.g., the infrared light absorbing ink, the described systems are capable of "invisibly" encoding a substantial amount of information. This substantial amount of information is usable to generate and display virtual objects directly in the user interface without interfering with visual features of the physical object because the code is not visible relative to the visual features.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for generating virtual objects from embedded code techniques described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 is illustrated as including an image capture device 104. The computing device 102 also includes an image processing system 106. The image processing system 106 is implemented at least partially in hardware of the computing device 102 to process and represent digital content 108, which is illustrated as maintained in storage 110 of the computing device 102. Such processing includes creation of the digital content 108, representation of the digital content 108, modification of the digital content 108, and rendering of the digital content 108 for display in a user interface 112 for output, e.g., by a display device 114. Although illustrated as implemented locally at the computing device 102, functionality of the image processing system 106 is also configurable entirely or partially via functionality available via the network 116, such as part of a web service or "in the cloud."

The computing device 102 also includes an embedded code module 118 which is illustrated to be incorporated by the image processing system 106 to process the digital content 108. In some examples, the embedded code module 118 is separate from the image processing system 106 such as in an example in which the embedded code module 118 is available via the network 116. For example, the embedded code module 118 is configured to generate virtual objects from embedded code.

The embedded code module 118 receives an input 120 including a frame of digital video 122 captured by the image capture device 104. The frame of digital video 122 depicts a physical object 124 including an embedded code 126. In an example, the frame of digital video 122 is generated by capturing reflected light in a visible spectrum and reflected light in an infrared spectrum which is not visible. The physical object 124 includes visual features, and the embedded code 126 is not visible relative to the visual features.

For example, the embedded code module 118 detects the embedded code 126 included in the physical object 124 depicted in the frame of digital video 122 displayed in the user interface 112 of the display device 114. In this example, the embedded code module 118 then determines a virtual object property based on the embedded code 126. In some examples, the embedded code module 118 also determines a boundary of the physical object 124.

The embedded code module 118 generates a virtual object 128 for display as an output 130 relative to the visual features of the physical object 124 in the user interface 112 based on the virtual object property. In other examples, the embedded code module 118 generates a virtual object 128 for display relative to the physical object 124 in the user interface 112 based on the boundary of the physical object 124.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Generating Virtual Objects from Embedded Code

Figure 2:
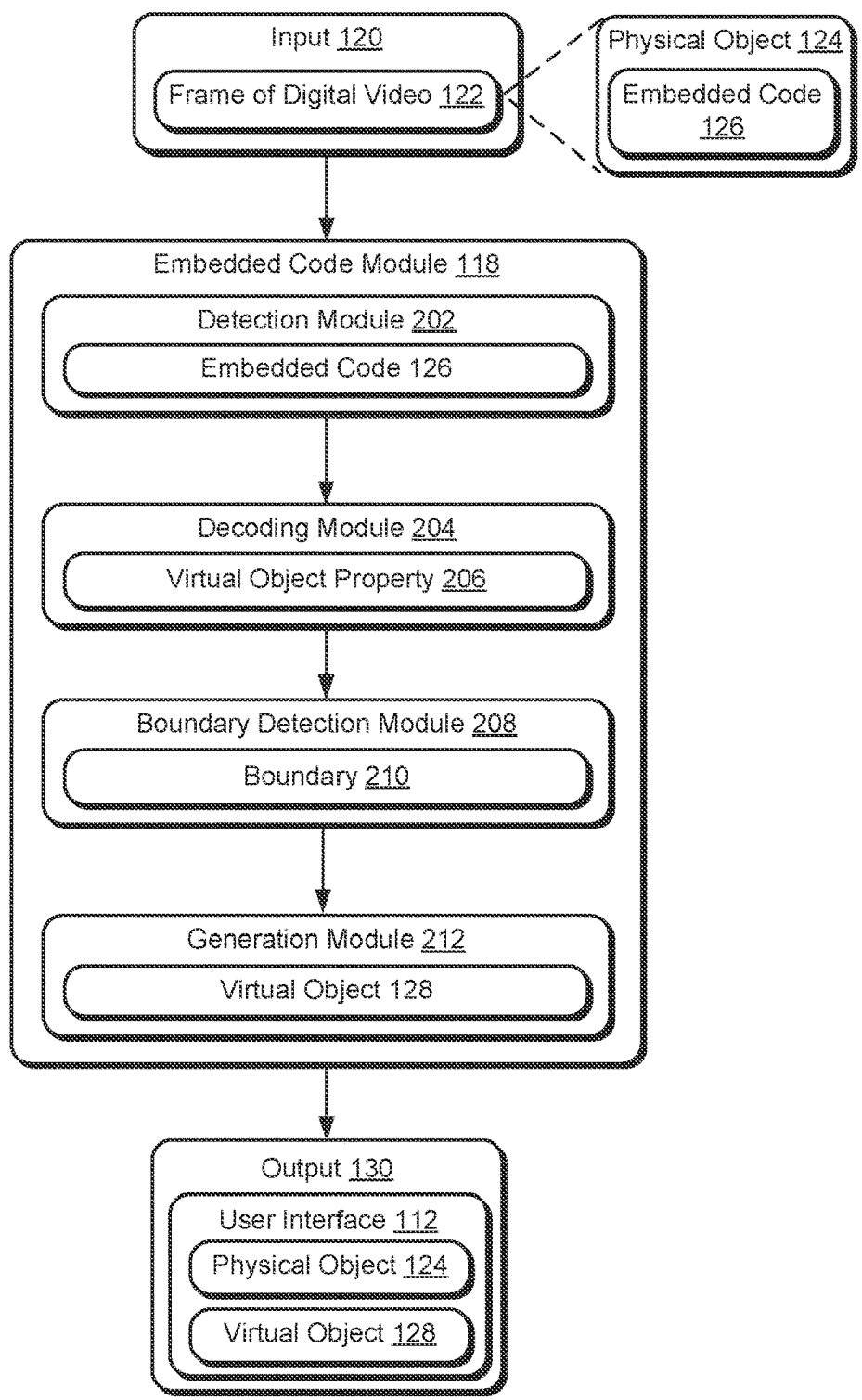
FIG. 2 depicts a system in an example implementation showing operation of an embedded code module for generating virtual objects from embedded code.

FIG. 2 depicts a system 200 in an example implementation showing operation of the embedded code module 118 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, the embedded code module 118 receives an input 120 including a frame of digital video 122. The frame of digital video 122 depicts a physical object 124 including an embedded code 126. The embedded code module 118 is illustrated to include a detection module 202. The detection module 202 detects the embedded code 126 included in the physical object 124 depicted in the frame of digital video 122 displayed in the user interface 112 of the display device 114. The physical object 124 includes visual features and the embedded code 126 is not visible relative to the visual features.

The embedded code module 118 also includes a decoding module 204. For instance, the decoding module 204 determines a virtual object property 206 based on the embedded code 126. In some examples, the embedded code module 118 also includes a boundary detection module 208. The boundary detection module 208 determines a boundary 210 of the physical object 124.

For example, the embedded code module 118 also includes a generation module 212. The generation module 212 generates a virtual object 128 for display relative to the visual features of the physical object 124 in the user interface 112 based on the virtual object property 206. In other examples, the generation module 212 generates a virtual object 128 for display relative to the visual features of the physical object 124 in the user interface 112 based on the boundary 210 of the physical object 124. The output 130 of the embedded code module 118 includes the physical object 124 and the virtual object 128 displayed in the user interface 112.

FIGS. 3-7 depict stages of generating virtual objects from embedded code. In some examples, the stages depicted in these figures are performed in a different order than described below.

Figure 3:
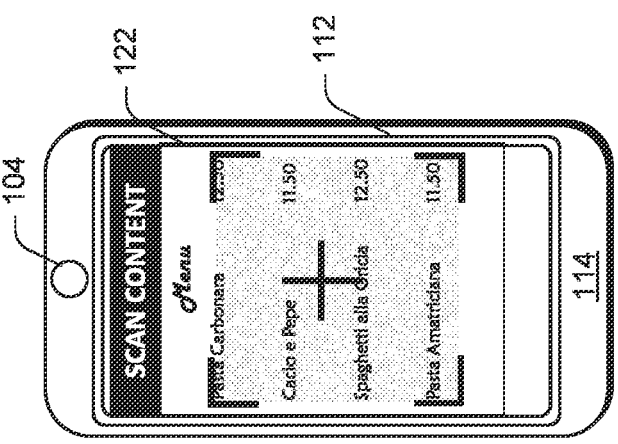
FIG. 3 depicts an example of detecting an embedded code.
Figure 3:
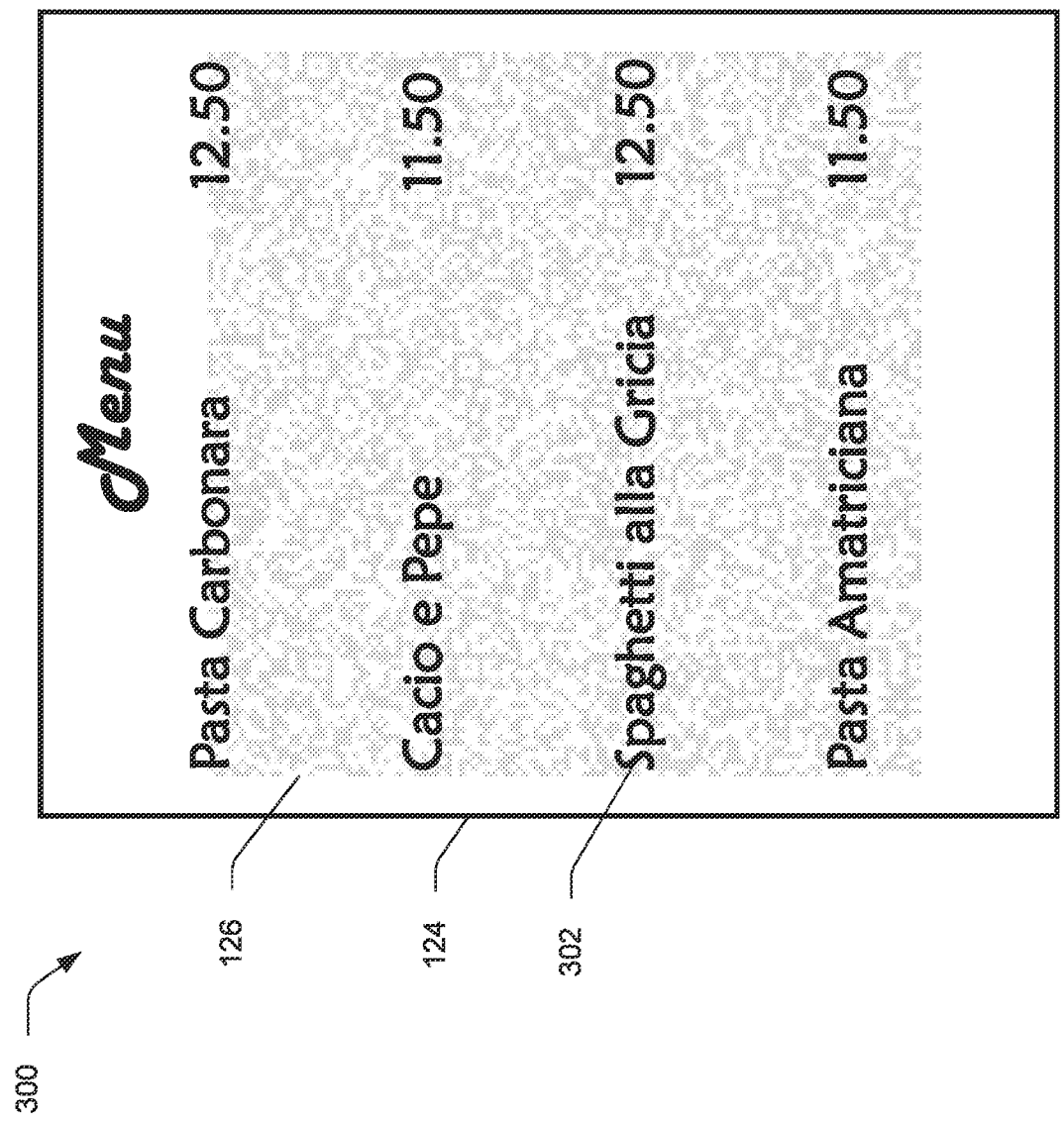

FIG. 3 depicts an example 300 of detecting an embedded code 126. As illustrated, the embedded code module 118 receives an input 120 including a frame of digital video 122 captured by an image capture device 104. In some examples, the image capture device 104 includes a camera that generates an image or video by capturing visible light. The image capture device 104 also includes an infrared camera that generates an image or video by capturing infrared radiation.

The image capture device 104 captures a frame of digital video 122 that depicts a physical object 124 including an embedded code 126. The physical object 124 includes visual features 302, and the embedded code 126 is not visible relative to the visual features 302. The embedded code 126 is depicted colored gray for illustrative purposes (e.g., to indicate that the embedded code 126 is not visible). In some examples, the embedded code 126 includes characters, code, or patterns printed on the physical object 124 using an infrared light absorbing ink.

In an example, the detection module 202 is implemented by a computing device 102 to prompt a user to scan content with an image capture device 104. The computing device 102 captures a frame of digital video 122 which is displayed in a user interface 112 of a display device 114 using an image capture device 104 equipped with both a camera and an infrared camera associated with the computing device 102. Here, the physical object 124 is a menu at a restaurant featuring a list of dishes offered, printed in visible ink (e.g., black ink) on paper. The text including "Pasta Carbonara," "Cacio e Pepe," "Spaghetti alla Gricia," and "Pasta Amatriciana" are visual features 302. The menu also includes an embedded code 126 printed in infrared light absorbing ink. The infrared light absorbing ink is invisible to the human eye but is detected using the infrared camera. The camera captures the visible menu in the frame of digital video 122, and the infrared camera captures the embedded code 126 in the frame of digital video 122.

In some examples, the computing device 102 processes live video feed from the infrared camera and alerts the user when an embedded code 126 is detected. In other examples, visible text included on the menu indicates that the embedded code 126 is detectable using the infrared camera.

In some examples, the camera and the infrared camera capture different frames of video. In these examples, the camera captures reflected light having a wavelength in a visible spectrum and the infrared camera captures reflected light having a wavelength in an infrared spectrum.

Figure 4:
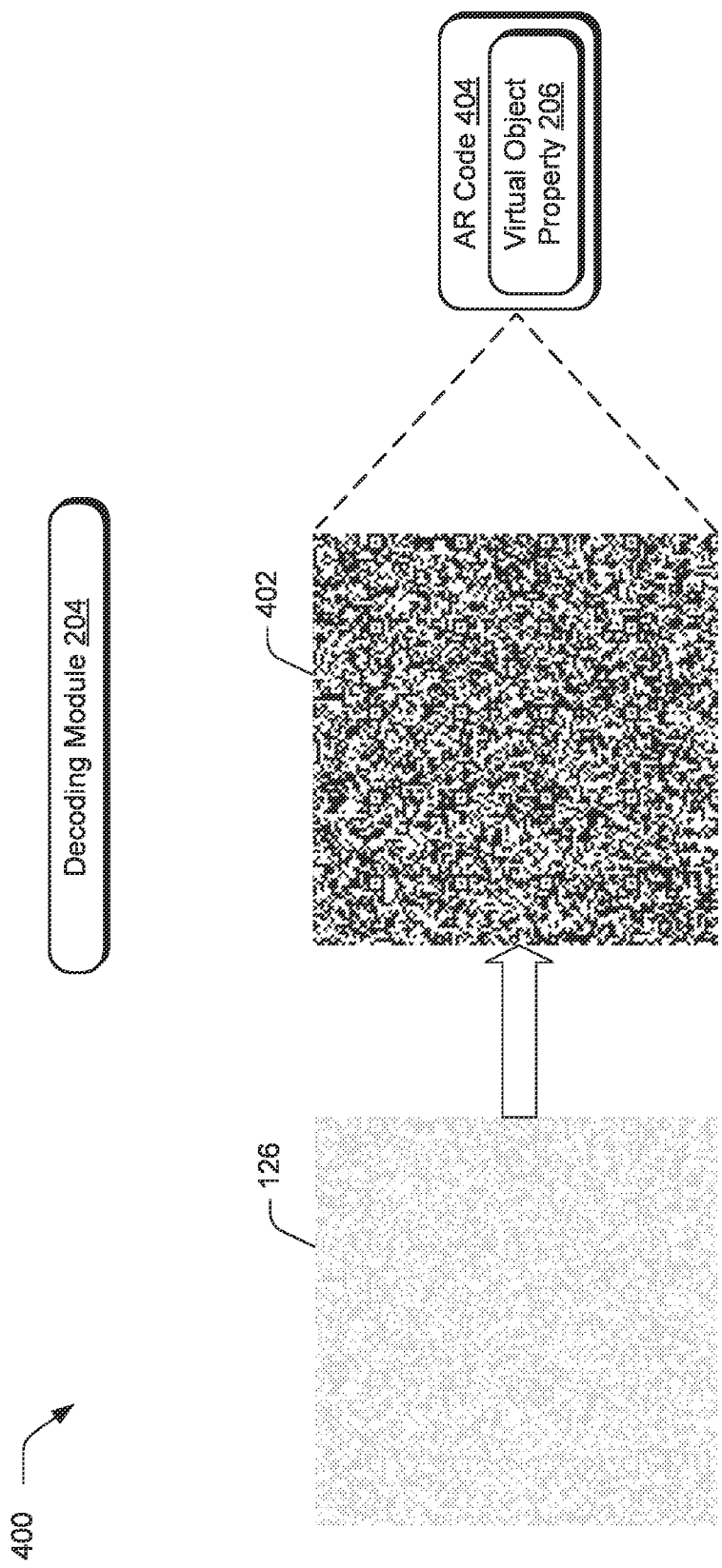
FIG. 4 depicts an example of decoding an embedded code.

FIG. 4 depicts an example 400 of decoding the embedded code 126. FIG. 4 is a continuation of the example described in FIG. 3. After the detection module 202 detects the embedded code 126 in the frame of digital video 122, the decoding module 204 determines a virtual object property 206 based on the embedded code 126.

In some examples, the decoding module 204 enhances the frame of digital video 122 containing the embedded code 126. The frame of digital video 122 is enhanced by applying a contrast limited adaptive histogram equalization filter to the frame, which generates a grayscale output with increased contrast and sharpness. This creates an enhanced image of the embedded code 402. In another example, an adaptive threshold is applied separately to the frame of digital video 122, which is then dilated and eroded based on an image gradient, which generates a binary output. This also creates an enhanced image of the embedded code 402.

The enhanced image of the embedded code 402 is then used as an input to a code reader. The code reader outputs messages extracted from the embedded code 126. For instance, the messages are combined to recover a string of AR Code 404. The AR Code 404 includes a virtual object property 206. In this example, the AR Code 404 is entirely embedded within the embedded code 126 (e.g., the AR Code 404 is accessible with or without a connection or access to the network 116). In other examples, a portion of the AR Code 404 is stored separately and is accessed via a network connection.

In some examples, a virtual object property 206 includes text, vectors, colors, or images. In other examples, a virtual object property 206 is an area of the physical object 124. For example, a virtual object property 206 is a text label in a specified color associated with a specific location of a physical object 124 determined by coordinate points.

Figure 5:
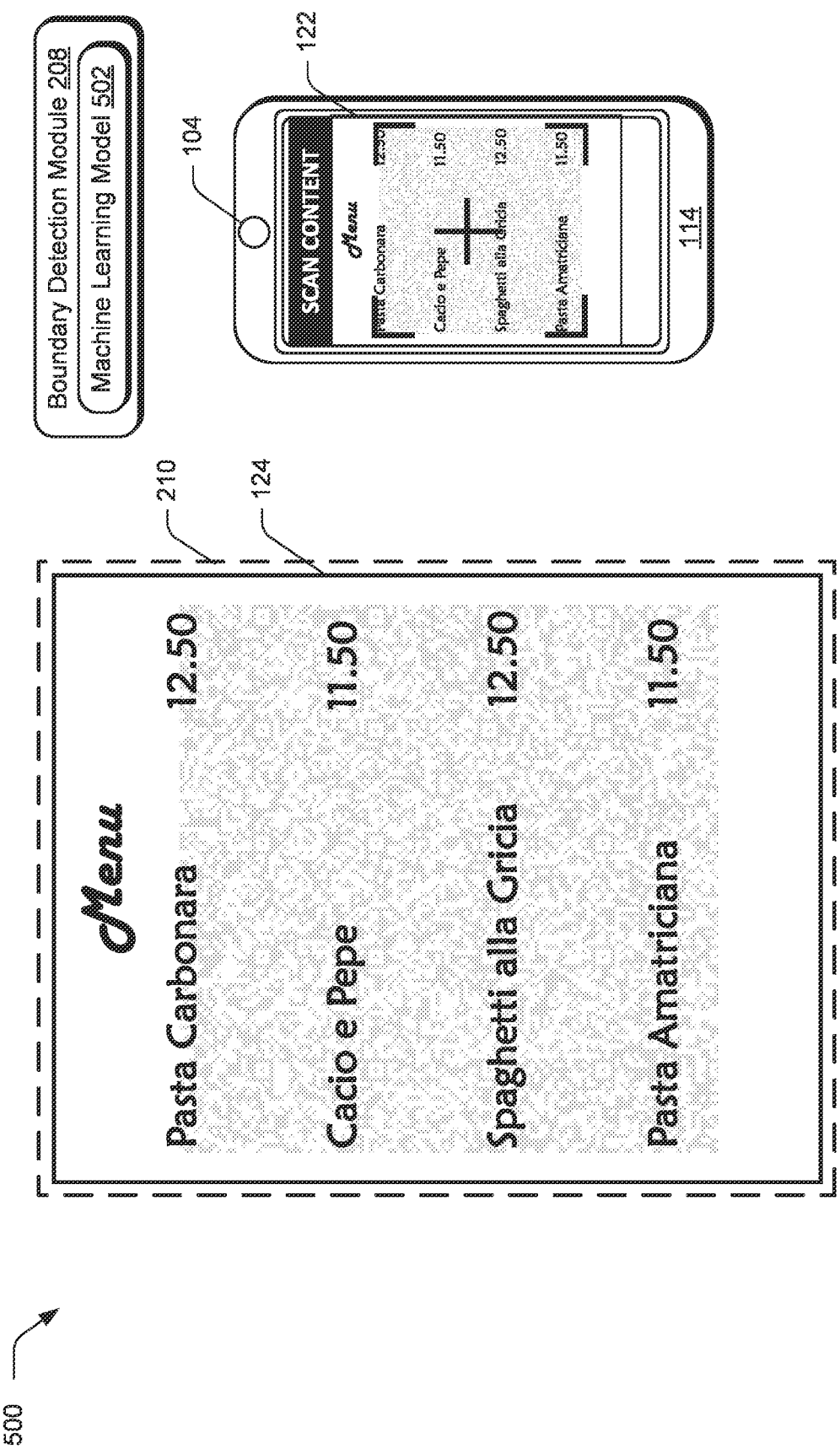
FIG. 5 depicts an example of detecting boundaries of a physical object.

FIG. 5 depicts an example 500 of detecting boundaries of the physical object 124. FIG. 5 is a continuation of the example described in FIG. 3. After the detection module 202 detects the embedded code 126 in the frame of digital video 122, the boundary detection module 208 detects a boundary 210 of the physical object 124.

In this example, an image capture device 104 including a camera captures the visible menu in the frame of digital video 122. The boundary detection module 208 then detects a boundary 210 of the physical object 124 using a machine learning model 502. The machine learning model 502 identifies the main document region to segment content from both textual and non-textual border noise using a convolutional neural network (CNN).

Figure 6:
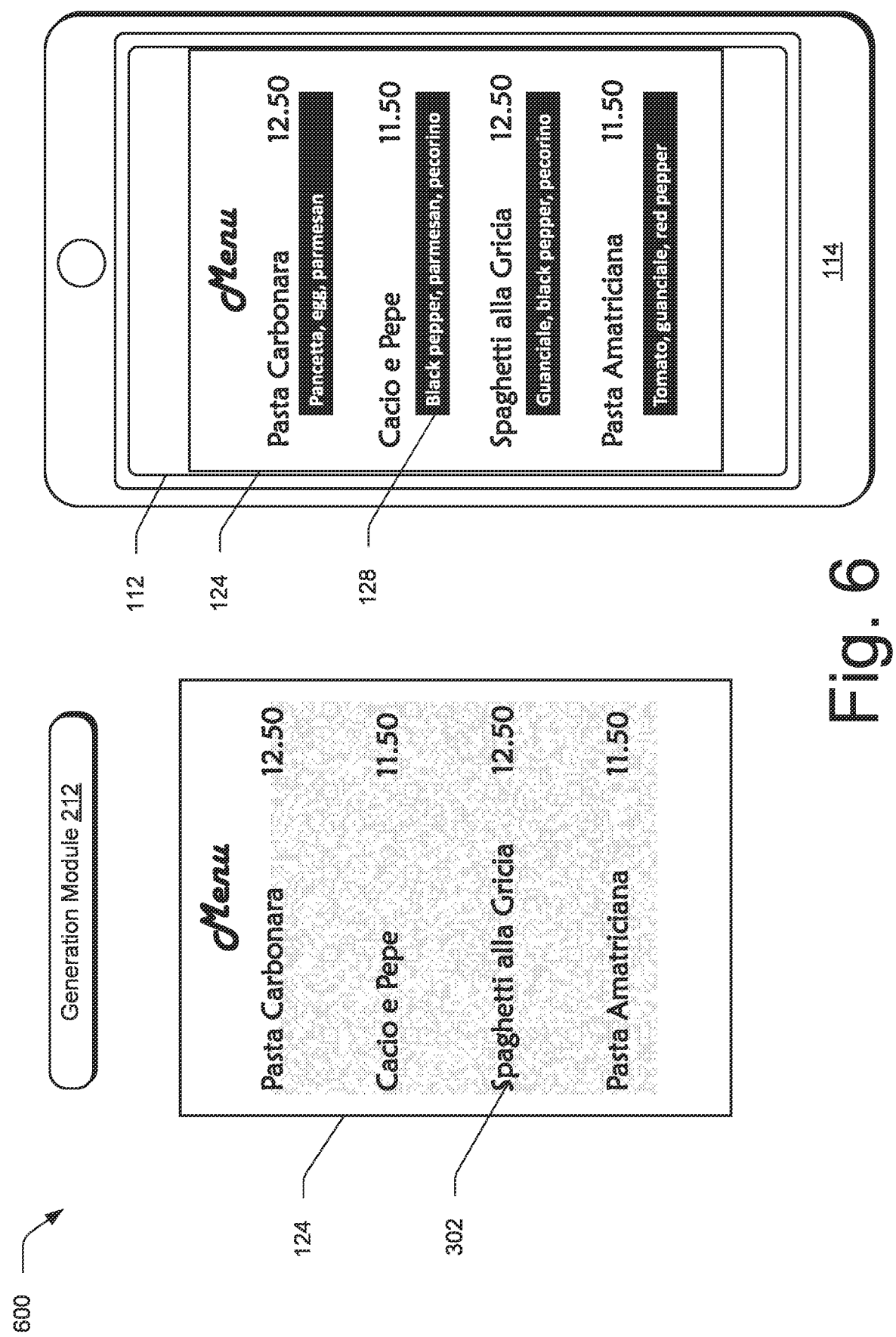
FIG. 6 depicts an example of generating a virtual object for display relative to the visual features of the physical object in the user interface.

FIG. 6 depicts an example 600 of generating a virtual object 128 for display relative to the visual features 302 of the physical object 124 in the user interface 112. FIG. 6 is a continuation of the example described in FIG. 4 and FIG. 5.

The generation module 212 generates a virtual object 128 based on the virtual object property 206. The virtual object property 206 used to automatically add content specified by the virtual object property 206 to the user interface 112.

In this example, the virtual object property 206 determined by the decoding module 204 includes ingredient labels for menu items specified by the embedded code 126. For example, the virtual object property 206 includes the text strings "Pancetta, egg, parmesan," "Black pepper, parmesan, pecorino," "Guanciale, black pepper, pecorino," and "Tomato, guanciale, red pepper." The virtual object property 206 also includes instructions to display white text over a black box. When executed by a processing device of the computing device 102, these instructions cause the processing device to generate a virtual object 128 depicting ingredient lists.

To display the virtual object 128 relative to the visual features 302 of the physical object 124, the virtual object property 206 includes coordinates relative to the boundary of the physical object 124 to display each text string. This ensures that the ingredient label is displayed below the correct menu item, as specified by the embedded code 126, when the virtual object 128 is rendered over the physical object 124 in the user interface 112.

In this example, the text string "Pancetta, egg, parmesan" is displayed just below the text "Pasta Carbonara" on the physical object 124 in the user interface 112 because the virtual object property 206 associates that text with that location. The text string "Black pepper, parmesan, pecorino" is displayed just below the text "Cacio e Pepe" on the physical object 124 in the user interface 112 because the virtual object property 206 associates that text with that location. The text string "Guanciale, black pepper, pecorino" is displayed just below the text "Spaghetti alla Gricia" on the physical object 124 in the user interface 112 because the virtual object property 206 associates that text with that location. The text string "Tomato, guanciale, red pepper" is displayed just below the text "Pasta Amatriciana" on the physical object 124 in the user interface 112 because the virtual object property 206 associates that text with that location.

In some examples, prefabricated components, such as the black rectangles containing the ingredient lists, are stored in a prefab library and are applied to the user interface 112. Examples of a virtual object include, but are not limited to, text, images, vector drawings, shapes, colors, three-dimensional content, and interactive content, such as buttons and sliders.

In other examples, the virtual object 128 is generated based on user information of a user that is associated with the computing device 102. An example of user information includes a language of the user that is associated with the computing device 102. An additional example of user information includes a location of the user that is associated with the computing device 102. An additional example of user information includes information based on a user input specified by the user. Other examples of user information include age, height, dietary restrictions, education level, occupation, security clearance, date, time, computing device type, or other designation.

In other examples, the generation module 212 generates the virtual object 128 based on the boundary 210 detected by the boundary detection module 208. The boundary 210 or border is used to rectify the document via a homography transformation. A homography transformation shifts an image scene from one view to another view of the same image scene by multiplying a homography matrix with the points in one view to find corresponding locations in another view. The rectified image is used to track and overlay the virtual object 128 on the frame of digital video 122 in the user interface 112. In some examples, the boundary 210 is also used to place specific elements of the virtual object 128 at associated locations or regions of the physical object 124 depicted in the frame of digital video 122 using coordinates relative to the boundary 210 of the physical object 124. In some examples, the user interface 112 is a user interface of augmented reality goggles or a virtual reality headset. In these examples, the computing device 102 is a computing device of the goggles or the headset, and the image capture device 104 is a camera or multiple cameras of the goggles or the headset.

Figure 7:
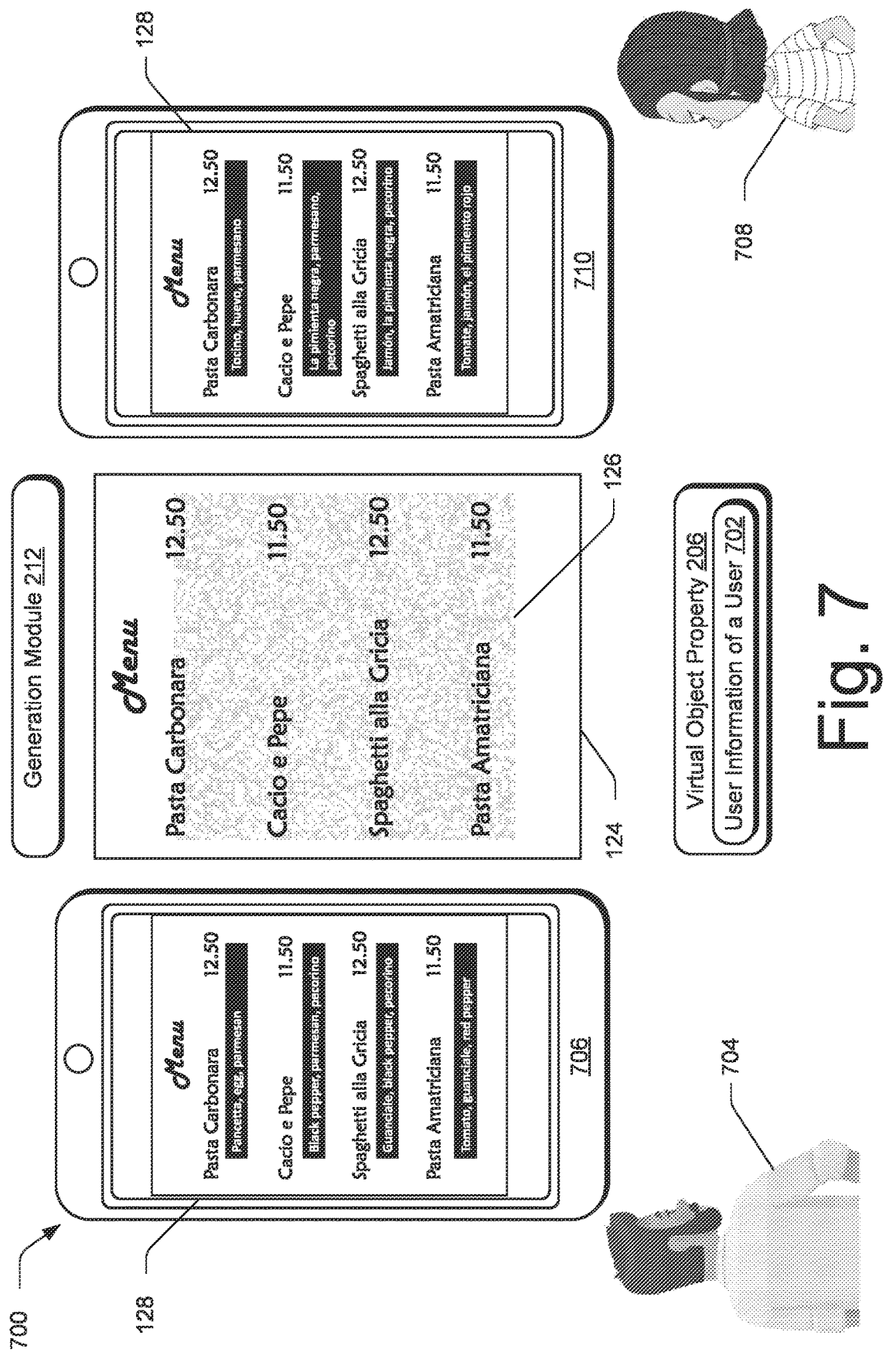
FIG. 7 depicts an additional example of generating a virtual object for display relative to the visual features of the physical object in the user interface.

FIG. 7 depicts an additional example 700 of generating a virtual object 128 based on the plurality of frames of digital video 122 using a page decomposition model. FIG. 7 is a continuation of the example described in FIG. 4 and FIG. 5.

The generation module 212 generates a virtual object 128 based on the virtual object property 206. In this example, the virtual object 128 is generated based on user information of a user 702 that is associated with the computing device 102. The user information includes a language of the user that is associated with the computing device 102.

In this example, a first user 704 sets the default language of a first user computing device 706 to English, associating the first computing device with the English language. A second user 708 sets the default language of a second user computing device 710 to Spanish, associating the first computing device with the Spanish language. The first user computing device 706 and the second user computing device 710 cause image captured devices to capture a frame of digital video 122 depicting the embedded code 126 printed on a physical object 124, which is a menu.

In this example, the virtual object property 206 includes ingredient labels for menu items. For example, the virtual object property 206 includes the text strings "Pancetta, egg, parmesan," "Black pepper, parmesan, pecorino," "Guanciale, black pepper, pecorino," and "Tomato, guanciale, red pepper" for display if a computing device is associated with the English language. Additionally, the virtual object property 206 includes the text strings "Tocino, huevo, parmesano," "La pimienta negra, parmesano, pecorino," "Jamón, la pimienta negra, pecorino," and "Tomate, jamón, el pimiento rojo" for display if the computing device is associated with the Spanish language.

Because the first user computing device 706 is associated with the English language, the virtual object 128 displays ingredient labels in English in the user interface 112 of the first user computing device 706. For example, the virtual object 128, which includes the text strings "Pancetta, egg, parmesan," "Black pepper, parmesan, pecorino," "Guanciale, black pepper, pecorino," and "Tomato, guanciale, red pepper," is displayed over the physical object 124 in the user interface 112 of the first user computing device 706.

Because the second user computing device 710 is associated with the Spanish language, the virtual object 128 displays ingredient labels in Spanish in the user interface 112 of the second user computing device 710. For example, the virtual object 128, which includes the text strings "Tocino, huevo, parmesano," "La pimienta negra, parmesano, pecorino," "Jamón, la pimienta negra, pecorino," and "Tomate, jamón, el pimiento rojo," is displayed over the physical object 124 in the user interface 112 of the second user computing device 710.

This allows different users to view information specifically curated for their preferences or demographic. An additional example of user information includes a location of the user that is associated with the computing device 102. Other examples of user information include age, height, education level, occupation, date, time, computing device type, or other designation.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

Figure 8:
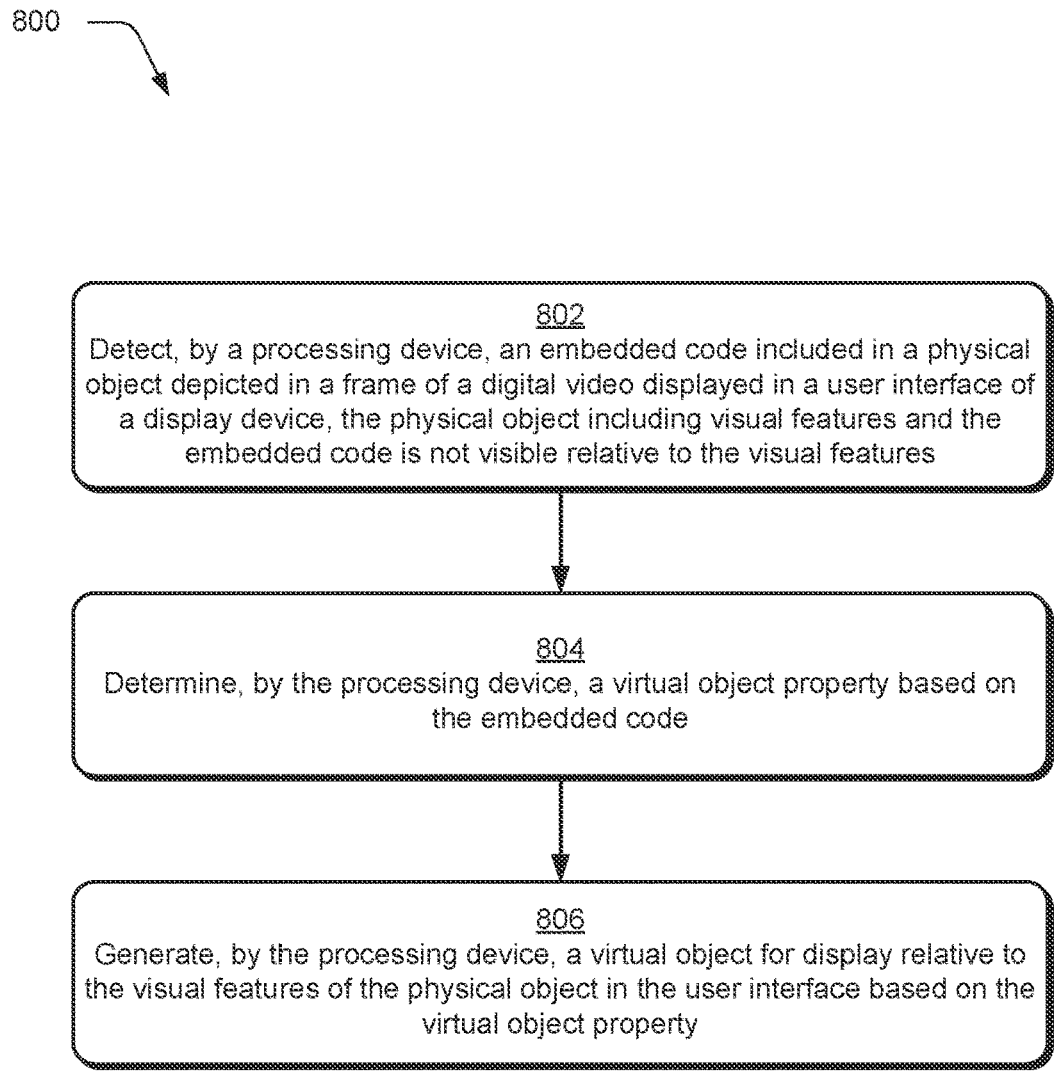
FIG. 8 depicts a procedure in an example implementation of generating virtual objects from embedded code.

FIG. 8 depicts a procedure 800 in an example implementation of generating virtual objects from embedded code. At block 802, an embedded code 126 included in a physical object 124 depicted in a frame of a digital video 122 displayed in a user interface 112 of a display device 114 is detected, the physical object 124 including visual features 302 and the embedded code 126 is not visible relative to the visual features 302. In some examples, the embedded code 126 includes characters (e.g., code, patterns, etc.) printed on the physical object 124 using an infrared light absorbing ink, creating a watermark. For instance, the embedded code 126 is detected by capturing the frame of digital video 122 using an infrared camera.

At block 804, a virtual object property 206 is determined based on the embedded code 126. In some examples, the virtual object property 206 is an area of the physical object.

At block 806, a virtual object 128 is generated for display relative to the visual features 302 of the physical object 124 in the user interface 112 based on the virtual object property 206. In some examples, the virtual object 128 is generated based on user information of a user that is associated with the computing device 102. For instance, the user information includes a language of the user that is associated with the computing device 102. In some examples, the user information includes information based on a user input specified by the user. Additionally or alternatively, the virtual object 128 is generated based on a boundary 210 of the physical object 124 that is determined using a machine learning model 502. In some examples, the user interface 112 is a user interface of at least one of augmented reality goggles or a virtual reality headset.

Figure 9:
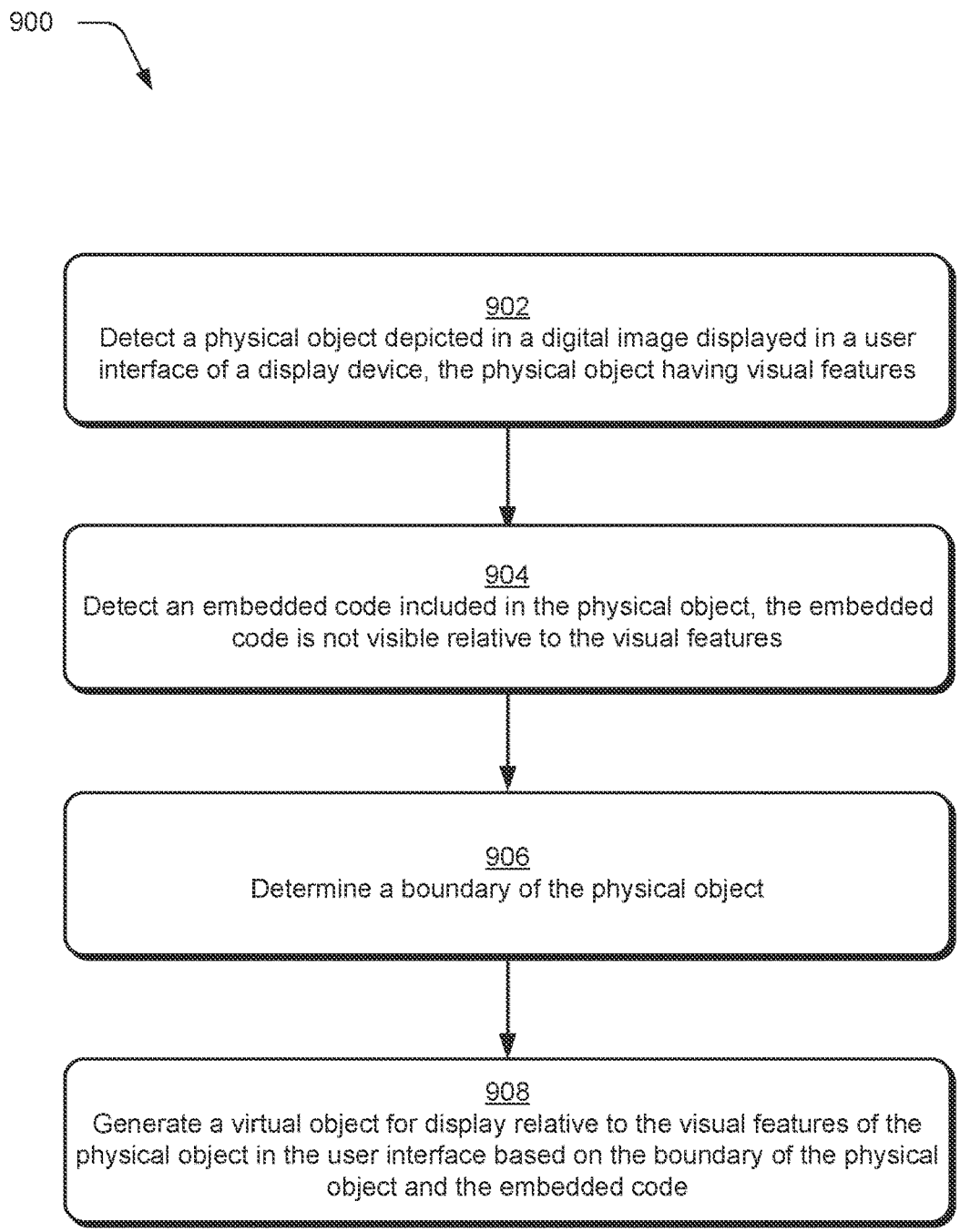
FIG. 9 depicts a procedure in an additional example implementation of generating virtual objects from embedded code.

FIG. 9 depicts a procedure 900 in an additional example implementation of generating virtual objects from embedded code. At block 902, a physical object 124 depicted in a digital image displayed in a user interface 112 of a display device 114 is detected, the physical object 124 having visual features 302.

At block 904, an embedded code 126 included in the physical object 124 is detected, the embedded code 126 is not visible relative to the visual features 302. In some examples, the embedded code 126 is detected by capturing the digital image using an infrared camera.

At block 906, a boundary 210 of the physical object 124 is determined. In some examples, the boundary 210 of the physical object 124 is determined using a machine learning model 502. Additionally or alternatively, a virtual object property 206 is determined based on the embedded code 126. In some examples, the virtual object property 206 is an area of the physical object 124.

At block 908, a virtual object 128 is generated for display relative to the visual features 302 of the physical object 124 in the user interface 112 based on the boundary 210 of the physical object 124 and the embedded code 126. In some examples, the virtual object 128 is generated based on the virtual object property 206. Additionally or alternatively, the virtual object 128 is generated based on user information of a user that is associated with the computing device 102.

Example Implementations

Figure 10:
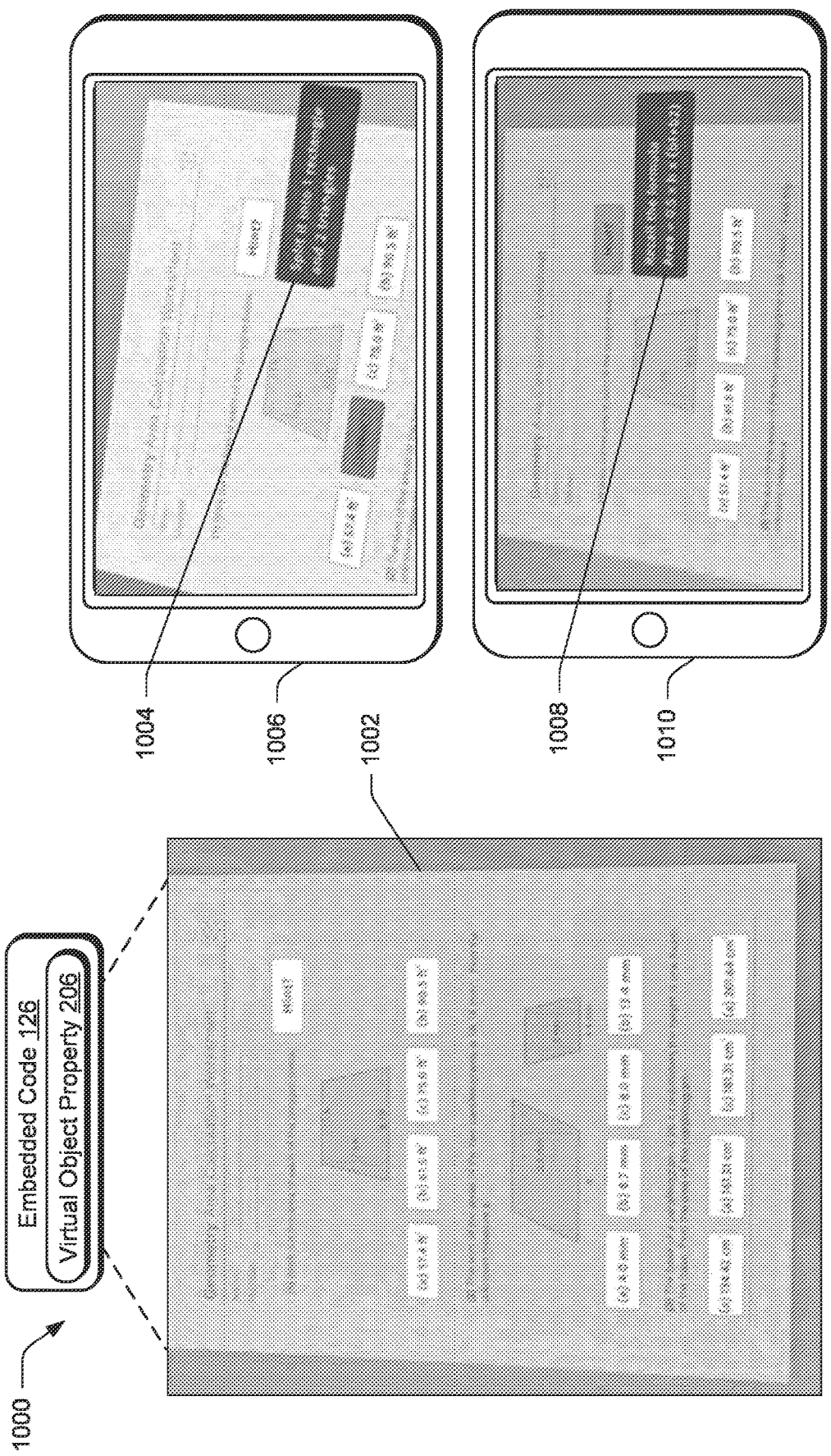
FIG. 10 depicts an example implementation of generating virtual objects from embedded code.

FIG. 10 depicts an example implementation 1000 of generating virtual objects from embedded code.

In this example, a page 1002 of a geometry textbook includes an embedded code 126 printed over a practice problem printed on the page 1002 in invisible infrared ink. The virtual object property 206 of the embedded code specifies a more detailed solution 1004 to the practice problem to be displayed in the user interface 112 of a computing device associated with a less advanced student 1006 and also specifies a less detailed solution 1008 to the practice problem to be displayed in the user interface 112 of a computing device associated with a more advanced student 1010. This allows each student to view a solution tailored to their educational needs. The solution is displayed over the image of the textbook page in the user interface 112, so the student does not need to flip pages to the back of the textbook to view the solution.

Figure 11:
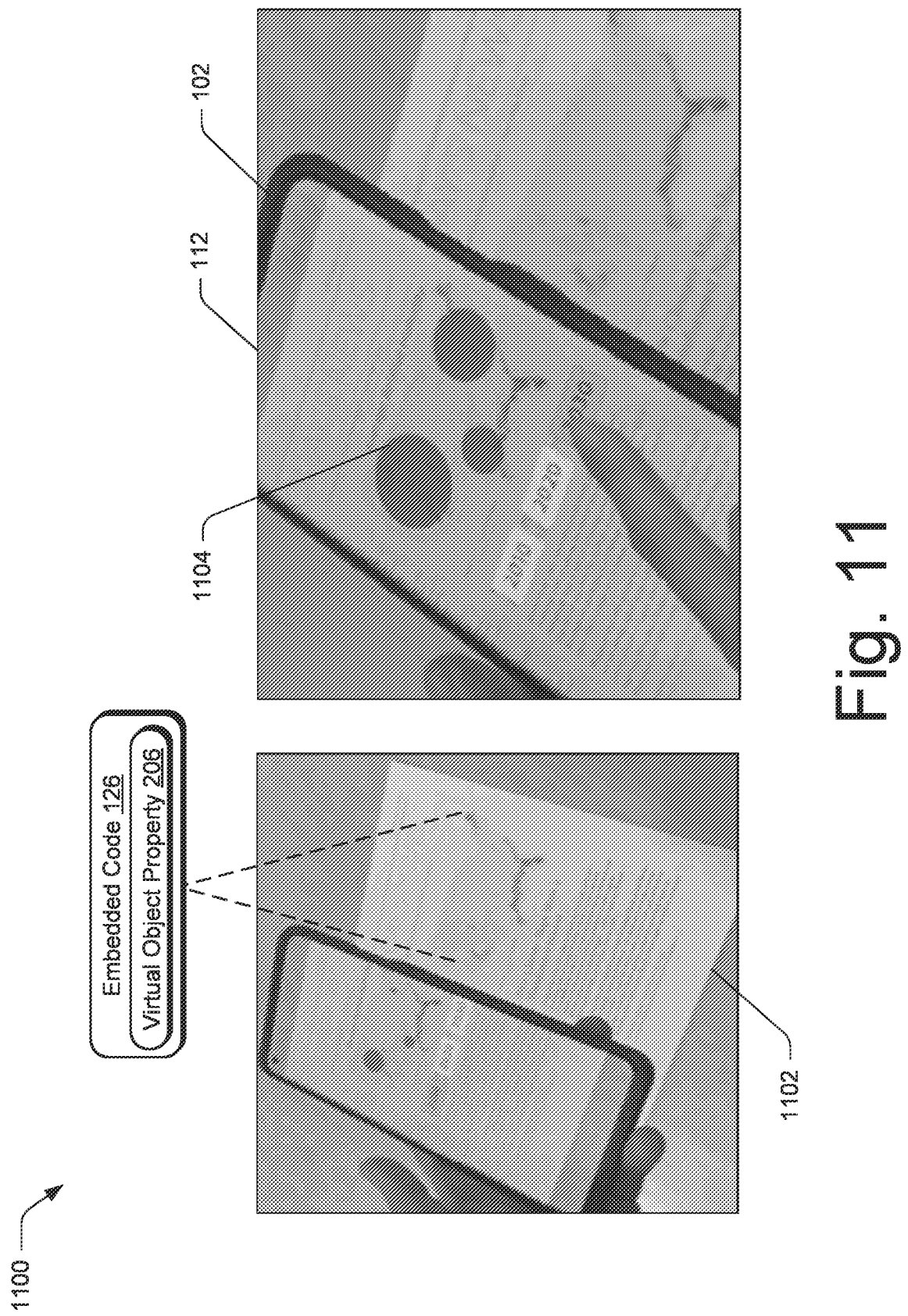
FIG. 11 depicts an additional example implementation of generating virtual objects from embedded code.

FIG. 11 depicts an additional example implementation 1100 of generating virtual objects from embedded code.

In this example, a magazine article includes an embedded code 126 printed over a map on a page of the article 1102 in invisible infrared ink. The virtual object property 206 of the embedded code specifies an interactive bubble chart 1104 related to the map showing statistics for different years related to the map when selected by a user. When displayed in a user interface 112 of a computing device 102, the user is able to tap one of the years on their phone. In response, the bubbles adjust to show statistics related to that year. This allows authors to include interactive information with their content.

Example System and Device

Figure 12:
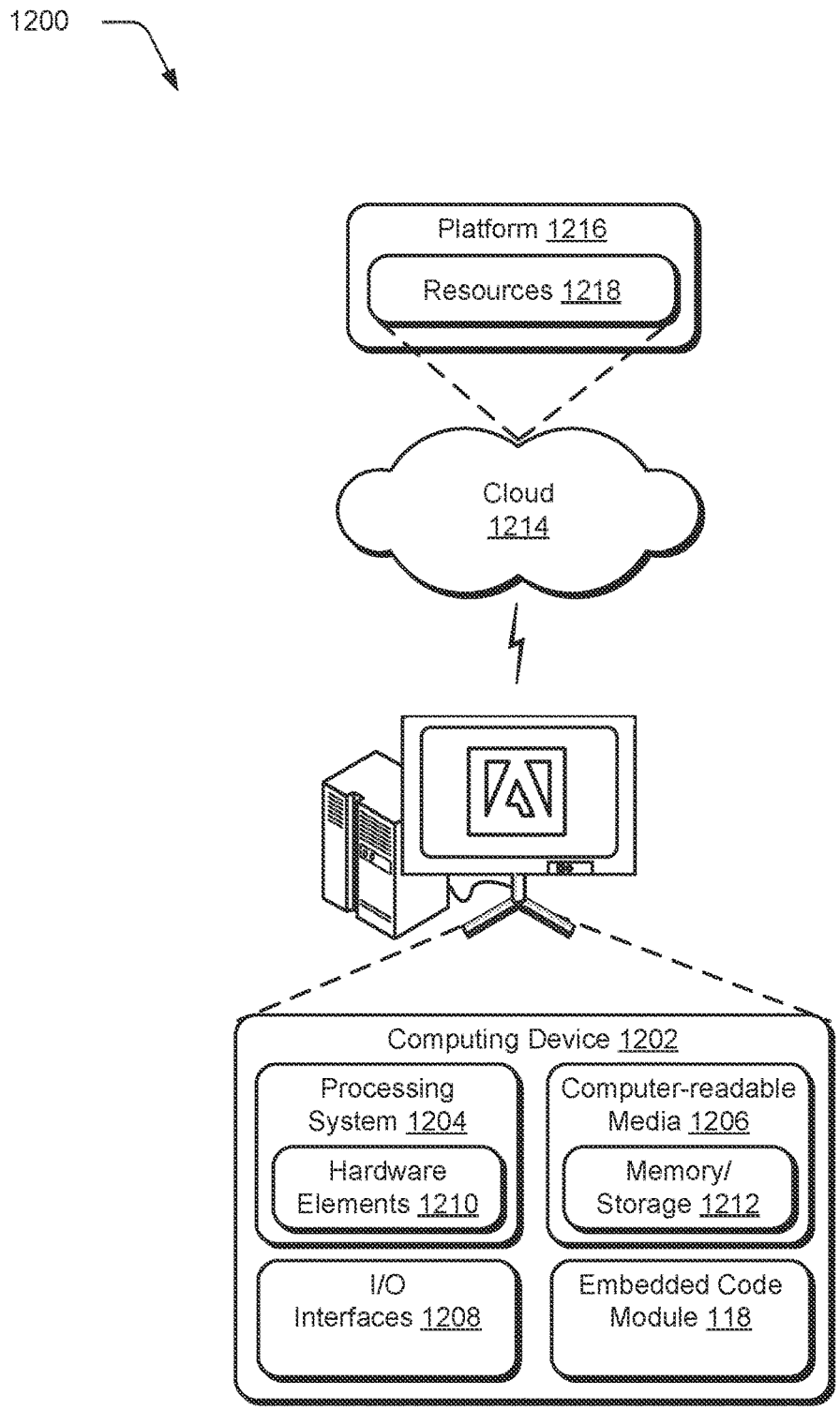
FIG. 12 illustrates an example system including various components of an example device that can be implemented as any type of computing device as described and/or utilized with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the embedded code module 118. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices and/or processing systems 1204) to implement techniques, modules, and examples described herein.

The techniques described herein are supported by various configurations of the computing device 1202 and are not limited to the specific examples of the techniques described herein. This functionality is also implementable through use of a distributed system, such as over a "cloud" 1114 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

What is claimed is:
1. A method comprising:
    detecting, by a processing device, an embedded code included on a physical object depicted in a frame of a digital video displayed in a user interface of a display device, the embedded code not visible relative to visual features of the physical object;
    decoding, by the processing device, information from the embedded code including an embedded image and information specifying coordinates relative to a boundary of the physical object for displaying the embedded image;
    determining, by the processing device, a location in the frame of the digital video corresponding to the coordinates relative to the boundary of the physical object for displaying the embedded image; and
    generating, by the processing device, the embedded image for display at the location in the frame of the digital video displayed in the user interface based on the information from the embedded code.

2. The method of claim 1, wherein the embedded code includes characters printed on the physical object using an infrared light absorbing ink.

3. The method of claim 1, wherein the embedded code is detected by capturing the frame of the digital video using an infrared camera.

4. The method of claim 1, wherein the embedded image is generated based on user information of a user that is associated with the processing device.

5. The method of claim 4, wherein the user information includes a language of the user that is associated with the processing device.

6. The method of claim 4, wherein the user information includes information based on a user input specified by the user.

7. The method of claim 1, further comprising determining the boundary of the physical object using a machine learning model.

8. The method of claim 1, wherein the information from the embedded code specifies an area of the physical object.

9. The method of claim 1, wherein the user interface is a user interface of at least one of augmented reality goggles or a virtual reality headset.

10. The method of claim 1, wherein the embedded image includes text displayed at the location in the frame of the digital video based on the information from the embedded code.

11. A system comprising:
    a memory component; and
    a processing device coupled to the memory component, the processing device to perform operations comprising:
        detecting a physical object depicted in a digital image displayed in a user interface of a display device, the physical object having visual features;
        detecting an embedded code included on the physical object, the embedded code not visible relative to the visual features;
        decoding information from the embedded code including an embedded image and information specifying coordinates relative to a boundary of the physical object for displaying the embedded image;

determining a location in the digital image corresponding to the coordinates relative to the boundary of the physical object for displaying the embedded image; and generating the embedded image for display at the location in the digital image, relative to the visual features and the boundary of the physical object in the user interface based on the information from the embedded code.

12. The system of claim 11, wherein the boundary of the physical object is determined using a machine learning model.

13. The system of claim 11, wherein the embedded image includes a visual property based on the information from the embedded code.

14. The system of claim 11, wherein the information from the embedded code specifies an area of the physical object.

15. The system of claim 11, wherein the embedded image is generated based on user information of a user that is associated with the processing device.

16. The system of claim 11, wherein the embedded code is detected by capturing the digital image using an infrared camera.

17. A non-transitory computer-readable storage medium storing executable instructions, which when executed by a processing device, cause the processing device to perform operations comprising:

detecting an embedded code included on a physical object depicted in a frame of a digital video displayed in a user interface of a display device, the embedded code not visible relative to visual features of the physical object;

decoding information from the embedded code including an embedded image and information specifying coordinates relative to a boundary of the physical object for displaying the embedded image;

determining a location in the frame of the digital video corresponding to the coordinates relative to the boundary of the physical object for displaying the embedded image; and generating the embedded image for at the location in the frame of the digital video displayed in the user interface based on the information from the embedded code.

18. The non-transitory computer-readable storage medium of claim 17, wherein the embedded image is generated based on user information of a user that is associated with the processing device.

19. The non-transitory computer-readable storage medium of claim 17, wherein the boundary of the physical object is determined using a machine learning model.

20. The non-transitory computer-readable storage medium of claim 17, wherein the information from the embedded code specifies an area of the physical object.

* * * * *